United States Patent
Larsen

[11] 3,871,397
[45] Mar. 18, 1975

[54] VALVE COMBINATION FOR AN OIL BURNER INSTALLATION

[75] Inventor: Peder Larsen, Augustenborg, Denmark

[73] Assignee: Danfoss A/S, Nordborg, Denmark

[22] Filed: Aug. 6, 1973

[21] Appl. No.: 385,892

[30] Foreign Application Priority Data
Aug. 22, 1972 Germany............................ 2241177

[52] U.S. Cl.............. 137/115, 137/116, 137/116.3, 137/117, 417/299
[51] Int. Cl. ........................................... G05d 7/01
[58] Field of Search ..... 137/115, 116, 116.3, 116.5, 137/117, 118, 569; 417/299

[56] References Cited
UNITED STATES PATENTS

| | | | |
|---|---|---|---|
| 2,178,223 | 10/1939 | Czarnecki | 137/116 |
| 2,469,362 | 5/1949 | Bashark | 417/299 |
| 3,322,134 | 5/1967 | Enemark | 137/116 |
| 3,446,230 | 5/1969 | Swedberg | 137/117 |
| 3,446,231 | 5/1969 | Magnusson | 137/117 |
| 3,692,038 | 9/1972 | Hansen et al. | 137/117 |
| 3,744,508 | 7/1973 | Hansen et al. | 137/116.3 |

FOREIGN PATENTS OR APPLICATIONS

| | | | |
|---|---|---|---|
| 1,230,161 | 12/1966 | Germany | |
| 1,501,813 | 7/1969 | Germany | 137/115 |

Primary Examiner—William R. Cline
Assistant Examiner—George L. Walton

[57] ABSTRACT

The invention relates to an oil burner fuel pump assembly. The assembly has three construction features which are (1) a cut-off valve which opens fully immediately after the pump is started and snaps shut immediately after the pump is turned off, (2) a regulating valve for maintaining a constant pressure for the nozzle and (3) a by-pass valve for instantly unloading the cut-off valve when the pump is turned off. A restriction to the fluid being exhausted in the pressure regulating function provides a pressure drop which is utilized to maintain the by-pass valve in an inoperative position during operation of the assembly. When the pump pressure diminishes the pressure drop likewise recedes and this recession is sensed by the by-pass valve which responds by moving to an operative position for unloading the cut-off valve.

7 Claims, 4 Drawing Figures

3,871,397

VALVE COMBINATION FOR AN OIL BURNER INSTALLATION

The invention relates to a valve combination, for the pumping pressure side of an oil burner installation, having a cut-off valve which closes a nozzle pipe in dependence upon the pumping pressure, a pressure regulating valve which controls the flow of oil through a return pipe, and a by-pass valve which is arranged in a by-pass pipe bridging the pressure regulating valve and opens when the pump is switched off.

In an oil burner installation the function of the cut-off valve is to close the nozzle pipe as soon as the required delivery pressure is no longer available. If the nozzle pipe is not closed in good time when the pump switches off, undesirable dripping of the oil occurs and this can lead to carbonization residues on the nozzle and the like. Since the pressure regulating valve also tends to maintain the delivery pressure after the pump has been switched off and since, due to fluctuations of pressure during operation, the pressure at which the cut-off valve responds must be considerably below the nominal pressure in order to ensure safety, cut-off valves often respond too late for the above mentioned disadvantages to be prevented.

A valve combination of the initially stated kind is known in which the pressure regulating valve is bridged by a by-pass valve which opens as soon as the electric motor that drives the pump is switched off. For this purpose use is made of a rotor which is axially displaced upon de-energization and which acts mechanically on the by-pass valve. When the by-pass valve opens, the delivery pressure drops suddenly. Consequently, the cut-off valve is able to close rapidly. It is also known (German Patent Specification No. 1,230,161) to provide a quantity measuring device, in particular a measuring restrictor, and to close the cut-off valve as soon as the flow rate drops below a predetermined level. This arrangement enables the cut-off valve to be actuated in a purely hydro-mechanical manner but it leads to an additional throttle resistance in the delivery pipe. The lower one tries to keep the throttle resistance the more difficult it becomes to cause the cut-off valve to respond at a welldefined flow rate.

The object of the invention is to provide a valve combination of the initially described kind which enables the oil to be cut off in a well-defined way in a purely hydro-mechanical manner.

According to the invention, this object is achieved by providing in the return pipe a flow rate measuring device, in particular a measuring restrictor, which is likewise bridged by the by-pass pipe and which opens the by-pass valve when the measured flow rate drops below a limit value.

When the pump is switched off, the quantity of oil returning by way of the pressure regulating valve diminishes. When oil is no longer returning, the oil pressure can no longer be maintained at the nozzle. If, therefore, the by-pass valve is opened with the aid of the flow rate measuring device and the cut-off valve is thus suddenly closed shortly before the quantity of returning oil reaches zero, it is certain that oil at the correct pressure has been supplied to the nozzle right to the end. A drop in pressure occurring at the flow rate measuring device is unimportant since this only affects the return quantity, and it is immaterial whether the total drop in pressure occurs at the pressure regulating valve alone, or at this valve and the measuring device.

The by-pass valve should become effective when the measured flow rate drops below a limit value, i.e., when the pump is switched off. There are various possible ways of maintaining the by-pass valve ineffective in other operating conditions. In particular, a check valve can be arrnaged in series with the by-pass valve, which check valve is closed when the pump starts up. Advantageously, there are also provided a coupling, which is fitted between the measuring device and the by-pass valve and is effective only in the opening direction, and a return device which closes the by-pass valve with a delay.

In many cases it is advantageous if the opening of the measuring restrictor is variable in dependence upon the flow rate. In this way the required dependence of the pressure drop on the flow rate can be achieved.

In a particularly simple construction, the by-pass valve is adjustable by means of an axially displaceable piston which is acted upon at one end by the pressure drop at the measuring restrictor and at the other by a setting spring. In this arrangement, the piston may be displaceable in a hollow cylinder, and the annular gap between the piston and the hollow cylinder may form the measuring restrictor.

It is also preferred, when the by-pass valve comprises an axial slide the periphery of which rides over a valve opening, that the return device is a return spring which presses the axial slide against a stop, and that the coupling is formed by a hollow cylindrical extension which is provided on the axial slide and is closed at one end, and into which a cylindrical setting element of the measuring device extends to form a flow restricting gap.

In this arrangement an axial bore in the cylindrical setting element of the measuring device can form a part of the by-pass pipe, and the check valve may have a transverse bore in the setting element, which bore is covered by the hollow cylindrical extension when the axial slide and the setting element are in the at-rest position.

When use is made of a known combination in which the pressure regulating valve has a valve slide which is acted upon at one end by the pump pressure and at the other by a setting spring, and which has peripheral recesses connected to the pumping pressure side which ride over return openings in a casing surrounding the valve slide, a particularly space saving construction is obtained if the valve slide contains a cavity which is closed at one end and in which the movable parts of the by-pass valve and the measuring device are accommodated.

A simple construction made up of few parts is obtained if the cavity is divided into an inner and outer compartment by a firmly inserted stop ring, if the inner compartment accommodates the axial slide of the by-pass valve and its return spring and communicates by way of a transverse bore with the peripheral recess in the valve slide of the pressure regulating valve, if the outer compartment accommodates the piston of the measuring restrictor and is connected to the return opening of the casing by way of a transverse bore disposed between the piston and the stop ring and if the piston is provided with a spindle which acts as a setting element and extends through the stop ring and which has an axial bore open at the same end as the cavity in the valve slide.

The invention will now be described in greater detail by reference to a form of construction illustrated in the drawing in which.

Figure 1:
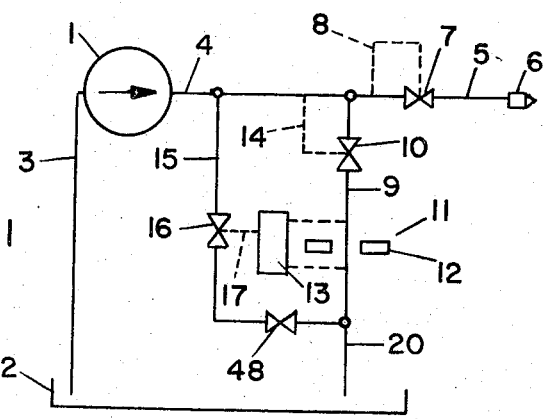
FIg. 1 is a diagrammatic illustration of the invention.

Referring to FIG. 1, a pump is connected to an oil tank 2 through a suction pipe 3. The pressure pipe 4 of the pump is connected to a nozzle 6 by way of a nozzle pipe 5. Fitted in this nozzle pipe is a cut-off valve 7 which, as shown by the dotted line 8, closes when the pressure in the pressure pipe 4 drops below a predetermined level. Branching from the pressure pipe 4 is a return pipe 9 in which are arranged in series a pressure regulating valve 10 and a flow rate measuring device 11 consisting of a measuring restrictor 12 and a pressure differential measuring means 13. As indicated by the dotted line 14 the pressure regulating valve 10 is so controlled by the pressure in the pressre pipe 4 that the oil pressure in the pressure pipe remains approximately constant. Also provided is a by-pass pipe 15 which has a by-pass valve 16 and bridges the series arrangement consisting of the pressure regulating valve 10 and the measuring device 11. As indicated by the dotted line 17, the normally closed by-pass valve 16 is opened as soon as the drop in pressure at the measuring restrictor 12 falls below a predetermined level.

During normal delivery of oil, i.e., when a flame is burning, the cut-off valve 7 is fully opened and the by-pass valve 16 is closed. The pressure regulating valve 10 allows flow through the return pipe 9 of sufficient oil to keep the pressure in the pipe 4 approximately at a predetermined level. If the pump is now switched off, the quantity that it delivers diminishes. The pressure regulating valve 10 closes gradually so as to maintain the pressure in the pressure pipe 4. The flow rate measuring device 11 measures a flow rate that is always smaller. If this flow rate falls below a predetermined level, the by-pass valve 16 opens. Since a considerable part of the delivered oil now flows through the by-pass pipe 15, the pressure in the pressure pipe 4 drops, and falls very rapidly below the level at which the cut-off valve 7 responds, and this valve closes. Thus the nozzle pipe 5 can be closed before the pressure drops below the delivery pressure necessary for correct operation of the nozzle.

Figure 2:
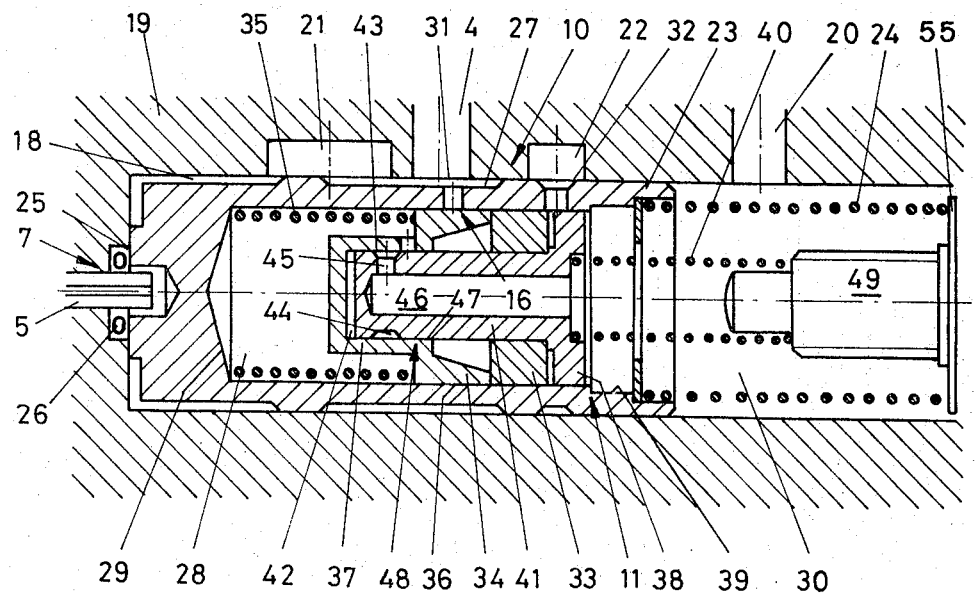
FIG. 2 is a longitudinal section through an embodiment of the invention in the at-rest position.
Figure 3:
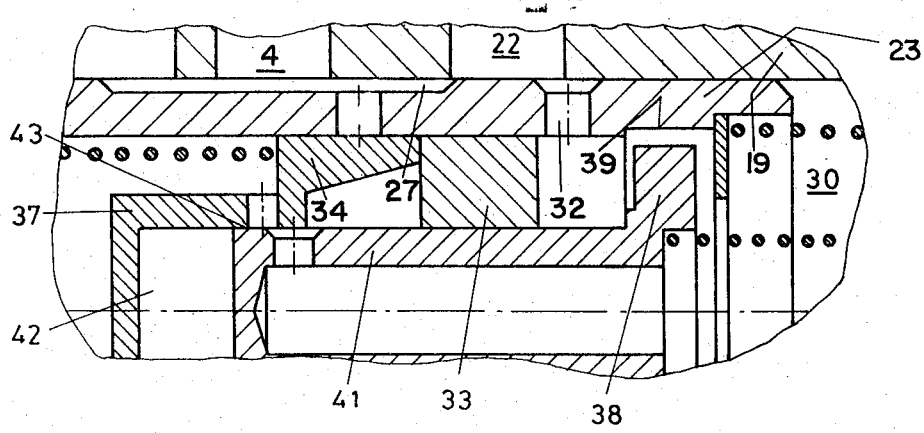
FIG. 3 shows a part of the embodiment seen in FIG. 2, but in the operating position.
Figure 4:
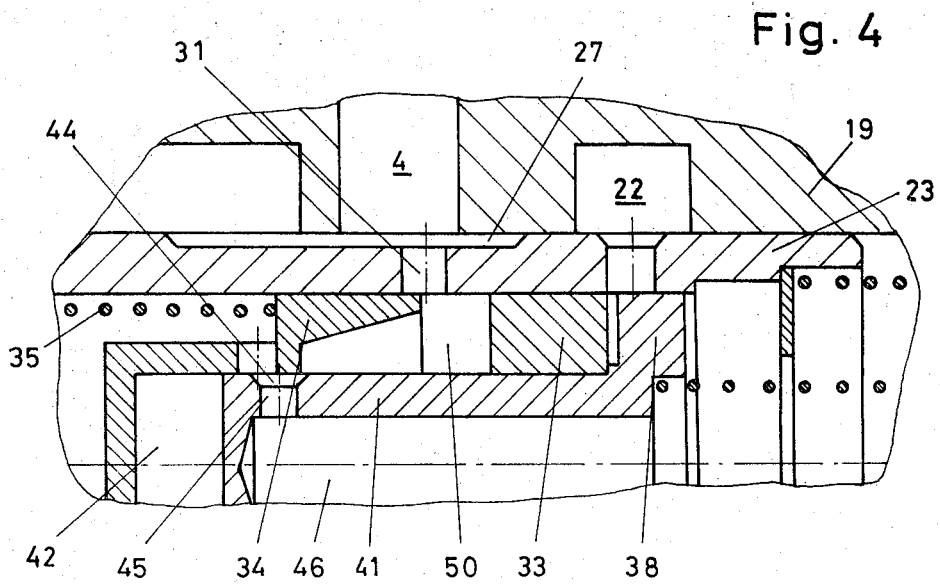
FIG. 4 shows a part of the embodiment seen in FIG. 2 after the pump has been switch off.

In the form of construction shown in FIGS. 2 – 4, the entire valve combination is accommodated in a bore 18 in the casing 19 of the pump 1. The pressure pipe 4, a return pipe 20 and the nozzle pipe 5 terminate in this bore. A connecting chamber 21 and a return opening 22 are also provided in the wall of the bore.

Provided in the bore 18 is a cylindrical valve slide 23 which is acted upon by a setting or biasing spring 24. The end face 25 of this valve slide, together with a sealing ring 26, forms the cut-off valve 7. A peripheral recess 27, togther with the return opening 22, forms the pressure regulating valve 10. This valve slide also has a cavity 28 which at that end presented to the cut-off valve 7 is closed off by an end wall 29, and which at the other end is open towards a chamber 30 connected to the return pipe 20. In the wall of the valve slide 23 is a first transverse bore 31, which runs from the peripheral recess 27, and a second transverse bore 32, which is disposed adjacent the return opening 22.

The cavity 28 is divided into two compartments by a stop ring 33. In the inner compartment is an axial slide 34 which is pressed against the stop ring 33 by a return spring 35. Its peripheral surface 36, together with the first transverse bore 31, forms and by-pass valve 16. The axial slide 34 has a hollow cylindrical extension 37 of smaller diameter which is closed at one end. Provided in the outer compartment is a piston 38 which, together with the inner surface 39 of the valve slide 23, forms the restrictor of a flow rate measuring device. 11. The piston is loaded by a setting or biasing spring 40. Connected to the piston is a spindle 41 which extends through the stop ring 33 in a fluid tight manner and which extends into the hollow cylindrical extension 37 with sufficient clearance that the space 42 between the parts communicates through a flow restricting gap 43 with a peripheral channel 44, which, through a transverse bore 45, communicates with an axial bore 46 which opens towards the compartment 30. The peripheral channel 44, together with the inner peripheral surface 47 of the hollow cylindrical extension 37, forms a check valve 48 which is only shown in broken lines in FIG. 1.

The setting springs 24 and 40 can be adjusted with the aid of the displaceable backing members 55 and 49.

Consideration of FIGS. 2 - 4 will show how this valve combination operates. In the at-rest position, the parts occupy the locations shown in FIG. 1. If the pump is switched on, pressure builds up at the end face 25 of the valve slide 23 by way of the pressure pipe 4, the peripheral recess 27 and the connecting chamber 21. As this takes place, only part of the end face is initially acted upon by the pressure. The cut-off valve opens when the force applied in this way overcomes the bias of the setting spring 24. Since the entire end-face 25 is subjected to pressure immediately thereafter, the cut-off valve opens fully. As this takes place, the edge of the recess 27 rides over the return opening 22. so that the pressure regulating valve 10 opens. By way of the bore 32 the oil pressure acts upon the left hand end of the piston 38 and presses this to the right against the force of the setting spring 40. When this occurs, the spindle 41 is withdrawn from the hollow cylindrical extension 37. This occurs the enlargement of the chamber 42, since the axial slide 34 is held firmly against the stop ring 33, and since the chamber 42 can be refilled with oil through the flow restricting gap 43.

Thus the operating position shown in FIG. 3 is reached. By way of the pressure regulating valve 27, 22 and the measuring restrictor 38, 39, part of the oil delivered by the pump flows through the compartment 30 and back into the tank. The return flow is so measured that the pressure upstream of the cut-off valve 7 remains substantially constant.

If the pump is now switched off the quantity of oil that it delivers drops. The associated reduction in pressure permits the valve slide 23 to slide leftwards. This causes a reduction in the flow of returning oil, and the delivery pressure is therefore kept at least approximately constant. When the quantity delivered approaches zero, this is a sign that the delivery pressure will soon no longer be sufficient. This condition is determined by the measuring device 11. The piston 38 is acted upon at one end by the drop in pressure at the measuring restrictor 38, 39, and at the other by the setting spring 40. If the pressure drop no longer suffices to overcome the force of the spring 40, the piston 38 moves to the left. As this happens it drives the axial slide 34 by way of the spindle 41 and the volume of oil contained in the chamber 42. The transverse bore 31 is uncovered and the by-pass valve 16 is thus opened. The still existing pump pressure acts in the space 50 and holds the axial slide 34 in the position illustrated in FIG. 4. In this position oil can pass directly into the return pipe 20 through the transverse bore 31, the space 50, the transverse bore 45, the axial bore 46 and the compartment 30. The pressure in the pressure pipe 4 drops correspondingly rapidly. This results in immediate closure of the cut off valve 7. The further oil still delivered by the pump can be passed directly to the tank by the route just described.

If the pump has stopped, and the pressure in that spaces 50 ceases, the axial slide 34 is returned to the at-rest position seen in FIG. 2 by the spring 35. This movement takes place gradually since part of the oil contained in the chamber 42 must be discharged through the flow-restricting gap 43. During this movement the transverse bore 31 on the one hand and the peripheral channel 44 on the other are covered again, so that both the by-pass valve 16 and the check valve 48 are closed. The pump can then be started up again.

I claim:

1. An oil burner fuel pump assembly comprising a casing having an inlet port and an outlet port, a nozzle, a fluid pressure operated spring biased main valve cooperable with said nozzle, exhaust port means in said casing cooperable with said main valve to regulate the pressure at said nozzle, fluid pressure operated spring biased restrictor valve means downstream from said exhaust port means cooperable with said casing to increasingly restrict the flow of fluid emanating from said exhaust port means in response to the pressure of the fluid in said exhaust port means, and bypass valve means responsive to the pressure difference on opposite side of said restrictor valve means to cause bypassing of pressurized fluid from said inlet port to said outlet port when said pressure difference drops to a predetermined minimum value to present dribbling of said nozzle.

2. A fuel pump assembly according to claim 1 wherein said by-pass valve means is in a flow path parallel to the flow path of said restrictor valve means, and check valve means in series with said by-pass valve means.

3. A fuel pump assembly according to claim 1 including a connection between said restrictor valve means and said by-pass valve means which causes both of said valve means to move in opening directions in unison and a delayed closing for said bypass valve means.

4. A fuel pump assembly according to claim 1 wherein the setting of said restrictor valve means is directly dependent upon the quantitative flow of fluid through said exhaust port means.

5. A fuel pump assembly according to claim 3 wherein said connection includes piston and cylinder elements.

6. A fuel pump assembly according to claim 2 wherein said by-pass valve means includes a collar portion cooperable with said inlet port and a central stepped down cylinder portion closed at one end, a piston portion connected to said restrictor valve means and being slidably disposed on said piston portion, a stop ring slidably disposed on said piston portion, said stop ring being cooperable with said restrictor valve means to form an expansible chamber fed by said exhaust port means for setting the position of said by-pass valve means.

7. A fuel pump assembly according to claim 6 wherein said piston portion has a port and a hollow center which form a part of said by-pass flow path, and a port in said cylinder portion registerable with said piston portion port to complete said by-pass flow path.

* * * * *